US005798502A

United States Patent [19]

Comer

[11] Patent Number: 5,798,502
[45] Date of Patent: Aug. 25, 1998

[54] TEMPERATURE CONTROLLED SUBSTRATE FOR VLSI CONSTRUCTION HAVING MINIMAL PARASITIC FEEDBACK

[75] Inventor: Donald T. Comer, Mapleton, Utah

[73] Assignee: Oak Frequency, Mount Holly Springs, Pa.

[21] Appl. No.: 644,234

[22] Filed: May 10, 1996

[51] Int. Cl.⁶ .................................................. H05B 1/02
[52] U.S. Cl. .......................... 219/497; 219/501; 219/209; 219/508; 307/141; 257/291; 257/547
[58] Field of Search ............... 219/209–211, 497, 219/501, 505, 508; 307/117, 141; 358/471; 257/291, 547, 373

[56] References Cited

U.S. PATENT DOCUMENTS

| | | | |
|---|---|---|---|
| 2,660,680 | 11/1953 | Koerner | 310/8.1 |
| 3,041,548 | 6/1962 | Keen et al. | 331/69 |
| 3,107,285 | 10/1963 | Knapp | 219/20 |
| 3,287,658 | 11/1966 | Sulzer | 331/69 |
| 4,216,371 | 8/1980 | Marotel | 219/501 |
| 4,330,723 | 5/1982 | Griffith | 307/456 |
| 4,396,892 | 8/1983 | Frerking et al. | 331/69 |
| 4,417,216 | 11/1983 | Davis | 330/294 |
| 4,560,959 | 12/1985 | Rokos et al. | 331/176 |
| 4,586,006 | 4/1986 | Emmons | 331/69 |
| 4,593,258 | 6/1986 | Block | 331/176 |
| 4,719,384 | 1/1988 | Hauden et al. | 310/343 |
| 4,839,613 | 6/1989 | Echols et al. | 331/69 |
| 4,858,022 | 8/1989 | Suzuki | 358/471 |
| 5,025,228 | 6/1991 | Gerard et al. | 331/69 |
| 5,041,800 | 8/1991 | Long et al. | 331/69 |
| 5,275,055 | 1/1994 | Zook et al. | 73/778 |
| 5,339,106 | 8/1994 | Ueno et al. | 348/243 |
| 5,614,744 | 3/1997 | Merrill | 257/291 |

*Primary Examiner*—Mark H. Paschall
*Attorney, Agent, or Firm*—Workman, Nydegger & Seeley

[57] ABSTRACT

A closed loop control system for controlling the temperature of a heated substrate is presented. In the preferred embodiment, the closed loop control system is implemented substantially or completely on a single substrate. The closed loop control system comprises means to reduce or eliminate parasitic feedback in the control system. In one aspect of the present invention, the mechanism for reducing the effects of parasitic feedback comprises a mechanism to prevent minority carriers from collecting around the base of the temperature sensing device. The mechanism for preventing minority carriers from collecting around the base of the temperature sensing device can be one or more guard rings which attract the minority carriers and prevent them from collecting around the base of the temperature sensor. In another aspect of the present invention, the mechanism for reducing the effects of parasitic feedback can be a sample and hold circuit which approximates the theoretically ideal sample and hold circuit in order to present a substantially open circuit to the parasitic feedback.

22 Claims, 8 Drawing Sheets

TEMPERATURE CONTROLLED SUBSTRATE FOR VLSI CONSTRUCTION HAVING MINIMAL PARASITIC FEEDBACK

BACKGROUND OF THE INVENTION

1. The Field of the Invention

This invention relates to apparatus and methods for reducing the effects of parasitic feedback in a control loop implemented on a substrate and, more specifically, to methods and apparatus for eliminating parasitic feedback in a temperature controlled substrate.

2. The Relevant Technology

A fundamental property of almost all electronic devices is that their characteristics change with temperature. Such changes may be minimal or may be dramatic, depending on the electronic device and the technology used to implement the electronic device. As a result many, if not all, electronic application circuits exhibit a tendency to change in some fashion when the temperature is raised or lowered. For many applications, the tendency of an application circuit to change in some fashion as the temperature varies has little or no effect on the utility of the application circuit. In some applications, however, it becomes extremely important to reduce or eliminate the effects of variation with temperature.

One well known application circuit which generally exhibits a variation with temperature is a crystal oscillator circuit. Crystal oscillator circuits utilize a crystal, such as quartz, to provide a fundamental resonant frequency. The resonant frequency is then amplified or otherwise used to create an application circuit that oscillates at a predetermined frequency. It is well known that the fundamental resonant frequency of a quartz crystal changes with temperature. Thus, in applications where a stable frequency reference is needed, it would be desirable to reduce or eliminate the frequency change which occurs as the temperature is changed. Any number of other application circuits may also exhibit characteristics which change according to temperature.

In order to reduce or eliminate variations of one or more characteristics of an application circuit with temperature change, two fundamental approaches are usually taken. The first approach is to compensate for the change in operating characteristics which occur when the temperature changes. Thus, in the example of an oscillator circuit, the circuit may be designed so that the oscillating frequency is adjustable over some frequency range. Then, as the fundamental oscillating frequency of the quartz crystal changes when the temperature changes, the oscillating frequency of the circuit can be tuned in order to compensate for the quartz crystal frequency change and maintain a stable frequency output independent of the temperature change.

A second approach taken to reduce or eliminate variations with temperature is to place the application circuit in an environment where the temperature is stable. Thus, many large mainframe computer systems are kept in a special room where the temperature is controlled very carefully in order to prevent the temperature of the room from varying outside a predetermined temperature range. In the case of individual application circuits, a mini environment can be established in order to maintain the circuit at a constant temperature. Returning to the example of a crystal oscillator, it is known in the art to place the oscillator circuit, including the crystal, in a chamber, cavity, or package, in which the temperature is elevated above ambient and then held constant by a temperature control system. Such an approach may also be used for any number of application circuits.

Referring to FIG. 1, a general block diagram of a temperature controlled application circuit is presented. In FIG. 1, the temperature of application circuit 10 is maintained by a closed loop control system, shown generally as 12. As indicated in FIG. 1, closed loop control system 12 has a heater 14 in thermal contact with application circuit 10. Thermal contact between application circuit 10 and heater 14 is illustrated in FIG. 1 by dashed line 16.

Heater 14 is driven by heater driver 18. Heater driver 18 is typically an amplifying circuit which amplifies an input signal to a sufficient level in order to supply heater 14 with enough energy to heat application circuit 10. In the example of FIG. 1, heater driver 18 uses an error signal as an input. Such an error signal is created by the difference of the desired set temperature 20 and the temperature measured by temperature sensor 22. In other words, heater 14 is driven in proportion to the temperature differential between a desired set temperature and the temperature measured by temperature sensor 22. Since closed loop control system 12 only has the capability to heat application circuit 10, desired set temperature 20 is generally selected to be higher than the ambient temperature.

In a closed loop control system which senses the temperature, such as closed loop control system 12 of FIG. 1, some delay typically exists between when heater 14 is activated and when temperature sensor 22 can measure the effect of the heat produced by heater 14. In FIG. 1, this is illustrated by thermal delay block 24. Furthermore, temperature sensor 22 does not measure only the effect of heater 14. Temperature sensor 22 also measures any effect of the ambient temperature. Often it is desirable to isolate the effects of ambient temperature as much as possible from closed loop control system 12 and/or application circuit 10. Thus, many heated application circuits are kept within insulated chambers or packages. This insulation will present a thermal resistance to any effect by the ambient temperature. This is modeled in FIG. 1 by thermal resistance block 26.

The approach illustrated in FIG. 1 has, with several variations, been utilized in both discrete component and hybrid packaged electronic circuits. In discrete component implementations of temperature controlled application circuits, the closed loop control system, such as closed loop control system 12, is typically implemented wholly or in part utilizing discrete components. In hybrid packaged electronic circuits, closed loop control system 12 is typically implemented using a hybrid technology where portions of the control system are implemented using some form of hybrid manufacturing technology such as a thick film or thin film manufacturing process. In either case, certain components may be manufactured utilizing integrated circuit technology, packaged separately and used in the circuit.

In order to reduce the power consumption and size of temperature controlled application circuits, the trend has been to implement a larger percentage of the closed loop control system using integrated circuit technology. Previous efforts have also included careful attention to thermal loss and great efforts have been expended on developing technology and packaging which maximizes the thermal transfer between the heater and the application circuit while minimizing the thermal transfer to or from the ambient environment.

In order to further reduce the size and power requirements of a temperature controlled application circuit, it would be desirable to form all or virtually all of the closed loop control system using integrated circuit technology on a single substrate. Attempts to create such a device, however, have largely met with failure due to a phenomenon referred to as parasitic feedback. Parasitic feedback is a phenomenon which can prevent temperature sensor 22 from measuring the true temperature of the substrate essentially causing an inability to properly control heater 14. Parasitic feedback can cause a closed loop control system, such as closed loop control system 12 of FIG. 1, to oscillate between a heater on condition and a heater off condition at an extremely high frequency e.g., into the kilohertz or megahertz range. In fact, parasitic feedback is the largest practical problem in designing a thermally controlled application circuit where the closed loop control system is implemented on a single substrate. The problem becomes particularly acute when using conventional CMOS processes.

It would, therefore, represent an advancement in the art to create a closed loop control system on a single substrate which substantially reduces or eliminates the effects of parasitic feedback. Furthermore, it would represent a particular advancement in the art to implement the functions of temperature sensing, heating, temperature control, and temperature programming on a single substrate using a conventional CMOS process without requiring special processing steps.

SUMMARY AND OBJECTS OF THE INVENTION

The foregoing problems in the prior state of the art have been successfully overcome by the present invention which is directed to a temperature controlled substrate for VLSI construction which allows a closed loop control system to be formed on a single substrate and which significantly reduces or eliminates parasitic feedback.

In one aspect of the present invention, a closed loop control system can be formed on a single substrate using conventional CMOS processes without requiring special processing steps. The closed loop control system contains devices which implement the functions of temperature sensing, heating, temperature control, and temperature programming on one integrated substrate. This will allow readily available VLSI processes for the construction of application specific integrated circuits (ASIC's) to be used in construction of very small and inexpensive temperature controlled application circuits. The embodiments within the scope of this invention contain mechanisms to substantially reduce or eliminate the effects of parasitic feedback on the closed loop control system. The present invention can be used with any type of closed loop control system where parasitic feedback is a problem. At least one embodiment of the present invention can also be applied to any closed loop control system with a relatively long time constant and where high frequency noise is a problem.

One presently preferred embodiment of the present invention comprises a closed loop control system fabricated on a single substrate using conventional CMOS processes. No special processing steps are required to fabricate the closed loop control system. The closed loop control system is designed to maintain the temperature of the substrate at a desired set temperature. The closed loop control system comprises a temperature sensor formed from a special purpose bipolar device fabricated on the substrate using conventional CMOS processes. The base emitter junction of the bipolar device is used as a temperature sensor since the base emitter voltage decreases with temperature by a very predictable amount. The temperature measured by the temperature sensor is compared to a desired set temperature and the difference is used to drive one or more amplifying stages which, in turn, drive one or more heater devices. Temperature sensing as well as the heater devices may be distributed at various locations on the substrate in order to minimize the effect of thermal gradients across the substrate. It is preferred that the temperature sensors and heaters be located in such a way that the temperature of the application circuit can be accurately sensed and little heat is wasted.

In order to reduce the effects of parasitic feedback in the closed loop control system, a variety of mechanisms may be provided which reduce or eliminate parasitic feedback. These mechanisms may be used either alone or in combination to achieve the desired amount of parasitic feedback reduction. In one embodiment, one mechanism to reduce parasitic feedback comprises one or more guard rings formed around the bipolar temperature sensor. The guard rings are constructed so as to minimize parasitic collection of minority carriers around the base of the bipolar device. Research has shown that one of the primary causes of parasitic feedback is the collection of minority carriers around the base of such a temperature sensor. By diffusing guard rings into the substrate, which encourage collection of the minority carriers around the guard rings rather than around the base of the temperature sensor, the effects of parasitic feedback can be greatly reduced.

In another embodiment, one mechanism to reduce parasitic feedback comprises sample and hold circuits, placed in the control loop before the amplifiers which drive the heater. If two such circuits are used, by synchronizing the sample and hold circuits so that one circuit is open when the other circuit is closed, the effects of parasitic feedback can be virtually eliminated. Such a mechanism presents an essentially open circuit to the parasitic feedback, which appears as a high frequency noise component, while still providing a sufficiently high data rate to allow the closed loop control system to operate effectively.

Accordingly, it is a primary object of the present invention to provide a closed loop control system which substantially reduces or eliminates the effects of parasitic feedback.

Another object of the present invention is to provide methods and apparatus of implementing the functions of temperature sensing, heating, temperature control, and temperature programming on single substrate using a conventional CMOS process, without requiring special processing steps.

Another important object of the present invention is to provide a temperature controlled substrate which can be used to heat an application circuit and which is very small and inexpensive to manufacture.

Yet a further object of the present invention is to allow implementation of a temperature controlled substrate in an ASIC gate array which may also include the application circuit.

Additional objects and advantages of the present invention will be set forth in the description which follows, and in part will be obvious from the description, or may be learned by the practice of the invention. The objects and advantages of the invention may be realized and obtained by means of the instruments and combinations particularly pointed out in the appended claims.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
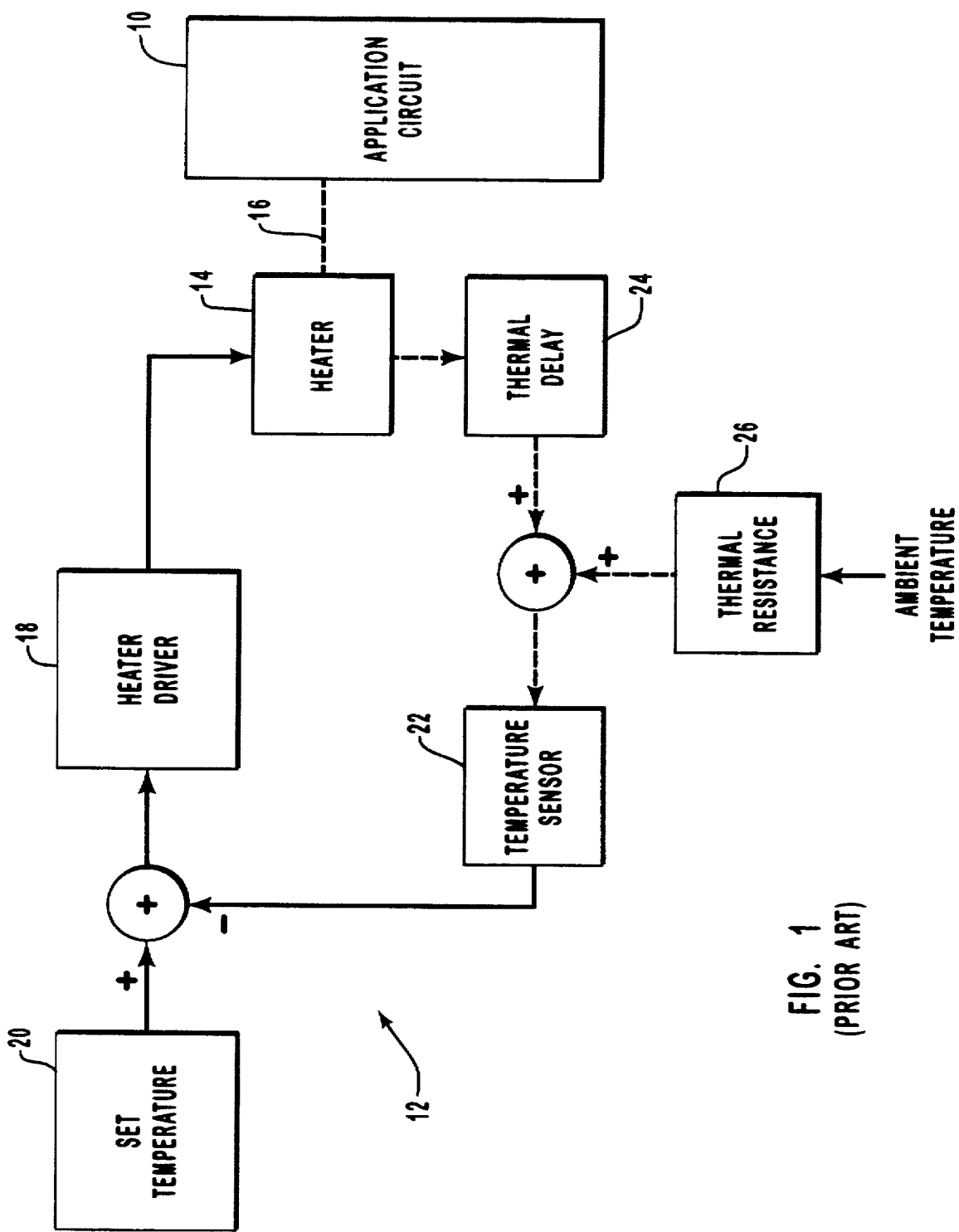
FIG. 1 is a block diagram of a prior art heated application circuit device.
Figure 2:
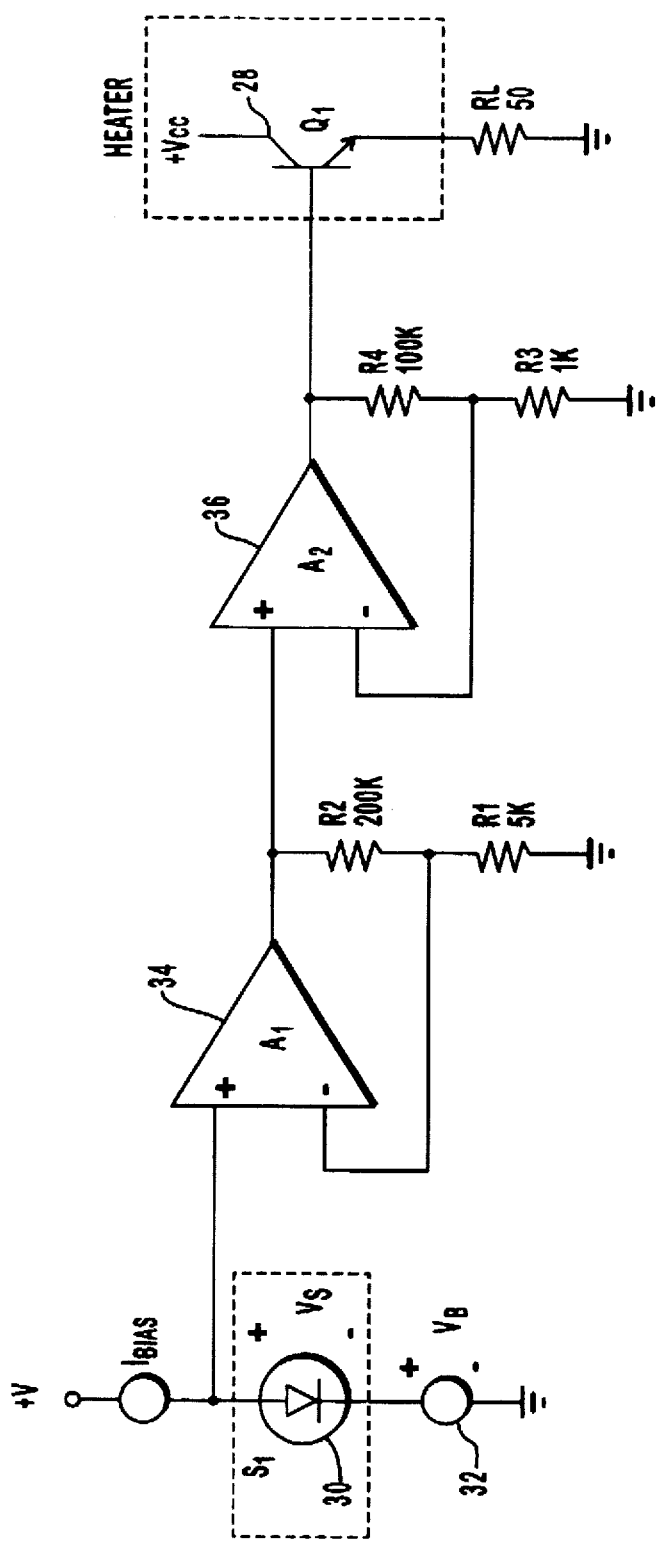
FIG. 2 illustrates a breadboard circuit diagram of one preferred embodiment of a closed loop control system.

In order to highlight the context of the present invention, problems which occurred and which were resolved by the present invention when constructing a preferred embodiment of a closely controlled system or a substrate heated application circuit is presented. Referring first to FIG. 2, a schematic of a laboratory breadboard that was constructed to test the performance of a preferred embodiment of a temperature controlled substrate is presented. A temperature controlled substrate circuit has temperature control means for forming a closed loop control system having a control loop for controlling the temperature of at least the substrate which is to be heated. The circuit presented in FIG. 2 is one example of such temperature control means. As illustrated in FIG. 2, the temperature control means comprises heater means for heating the substrate. In FIG. 2 such heater means is illustrated by transistor 28. In the laboratory breadboard circuit shown in FIG. 2, a single transistor is illustrated. However, the heater means for heating the substrate may also comprise a plurality of such devices. By spacing transistors of various types around the substrate at various locations, beneficial effect may be gained by minimizing thermal gradients within the substrate or minimizing thermal gradients between the heater means and an application circuit which is to be heated by the substrate. In addition to transistor devices, other types of electronic devices may also be used for the heater means. In the context of this invention, heater means should be construed broadly and may comprise any electronic device or group of electronic devices which are used to heat the substrate.

Throughout this application, reference will be made to an application circuit which is to be heated by a temperature controlled substrate. As used herein, the term "application circuit" is intended to be broadly construed, as the present invention can be utilized with any application circuit where it would be beneficial to remain at a constant, or nearly constant, temperature.

The temperature control means of the present invention also comprises temperature sensing means for sensing the temperature of the substrate. In FIG. 2 such temperature sensing means is illustrated by temperature sensor 30. In FIG. 2, the temperature sensing means is implemented by a diode connected silicone transistor. Such a sensor will produce a fixed voltage of about 700 millivolts at room temperature, with a temperature dependence of about 2.5 millivolts per degree Celsius. The sensor voltage $V_s$ may then be expressed as:

$$V_s = 0.7 - 0.0025 \Delta T$$

Where: $V_s$ is the sensor voltage.

$\Delta T$ is the change in temperature from room temperature in degrees celsius.

In the laboratory breadboard circuit that was constructed to test the performance of one embodiment of the temperature controlled substrate, transistor 28 is a bipolar device which is constructed on a bipolar integrated circuit chip, which also includes a second bipolar transistor device, namely the diode used to implement temperature sensor 30. Because the heater transistor 28 and temperature sensor 30 were formed on the same integrated circuit chip, they are in thermal contact with each other. In FIG. 2 this is illustrated by the dashed boxes which surround both transistor 28 and temperature sensor 30. In the breadboard the bipolar integrated circuit chip was mounted in a conventional ceramic side brazed dual-in-line package.

The temperature control means may also comprise means for setting the desired temperature. In FIG. 2, such means for setting the desired temperature comprises voltage source 32. An examination of the combination of temperature sensor 30 and voltage source 32 indicates that as the temperature rises, the combination of $V_s$ and $V_b$ will approach $V_b$. Thus, $V_b$ will determine the temperature at which the circuit stabilizes. Depending on the type of technology used, other mechanisms for setting the temperature may also be used.

Temperature control means may also comprise heater control means for controlling the heater means in response to the temperature sensed by the temperature sensing means. Such heater control means generally comprises some sort of amplifying circuit which can amplify the voltage or current produced by a temperature sensor and drive the heater means in proportion to the voltage or current of the temperature sensor. In FIG. 2 the heater control means comprises op-amp 34 and op-amp 36 along with their associated biasing resistors R1–R4. In the breadboard circuit, op-amp 34 and op-amp 35 are general purpose op-amps (UA 741 type) manufactured by National Semi Conductor Corp. In general, the types of device utilized for the heater control means will be dependent upon the gain which is necessary in order to amplify a voltage or current produced by the temperature sensing means to an appropriate level to drive the heater means. In FIG. 2, a two stage gain is used. This, however, is generally not necessary if the gain required is of a relatively moderate value. For the circuit illustrated in FIG. 2, an examination of the gain produced by op-amp 34 and op-amp 36 reveals that the combined gain is approximately 4,000. The reason for using two op-amp stages instead of a single, higher gain stage is that it is somewhat more difficult to achieve the desired gain from a single op-amp using realistic resistor values.

Constructing the breadboard circuit illustrated in FIG. 2 demonstrated that the circuit produced satisfactory results and was stable as a breadboard circuit. However, when attempts were made to implement the circuit on a single substrate using a CMOS process, parasitic feedback made the circuit unstable and oscillate at a very high frequency.

Figure 3:
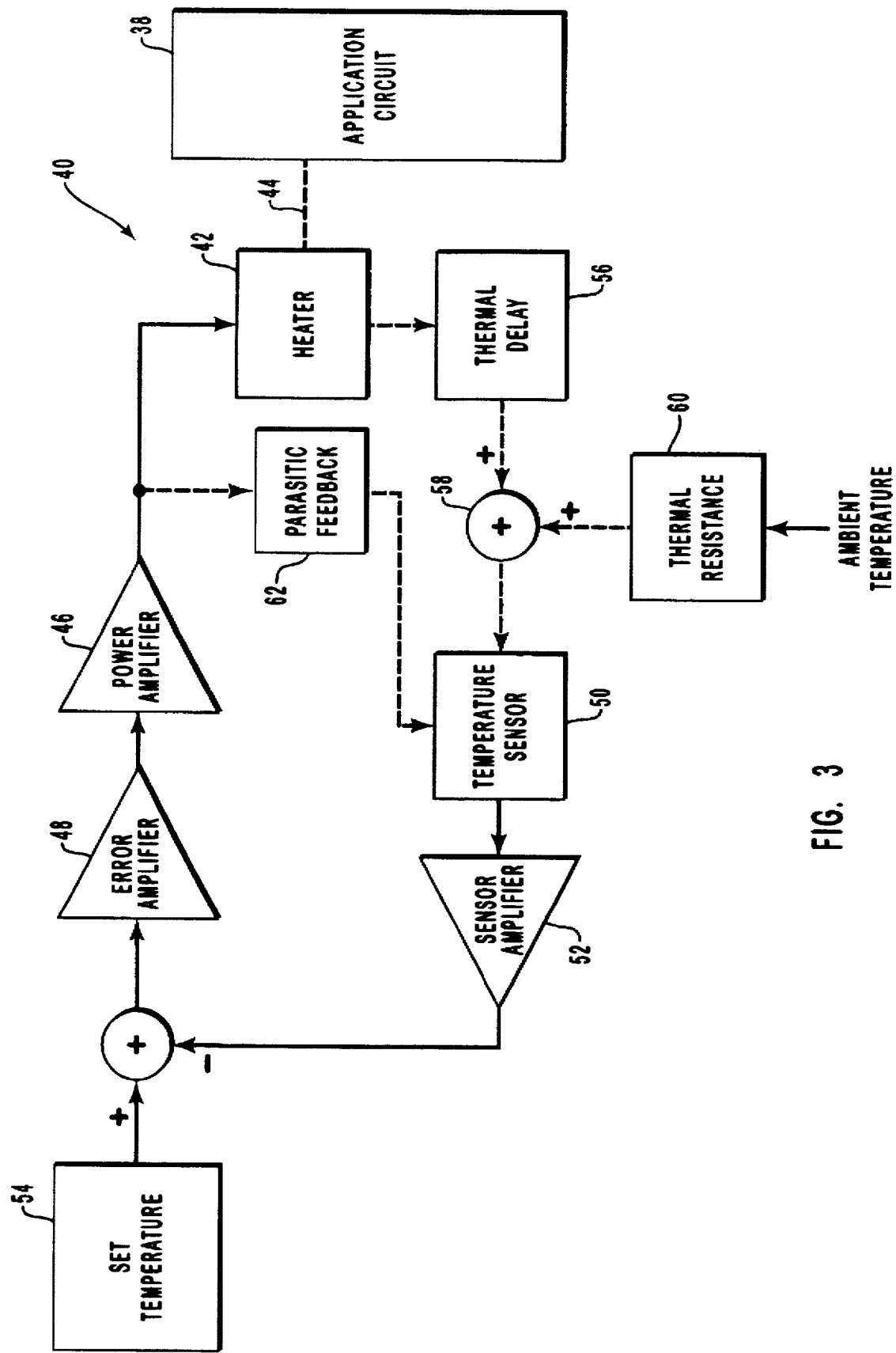
FIG. 3 is a block diagram of a substrate heated application circuit illustrating the parasitic feedback path.

Referring now to FIG. 3, a diagram of a temperature control means with the effects of parasitic feedback is illustrated. Parasitic feedback may be caused by a variety of mechanisms which are not present in the discrete component or hybrid implementation of the same circuit. Some common parasitic feedback mechanisms in integrated circuits include signal coupling between adjacent lines by parasitic capacitance or through substrate capacitance, parasitic coupling because of ohmic ground line connections, ohmic drops in the substrate, and parasitic injection of charge carriers into the substrate or into regions of intended isolations, where they may be collected by electrodes intended for other purposes. With reference to FIG. 3, one preferred embodiment of an application circuit which is heated by a temperature controlled substrate is presented. As illustrated in FIG. 3, application circuit 38 is heated by temperature control means for forming a closed loop system having a control loop for controlling the temperature of at least a substrate. In FIG. 3, the closed loop control system is illustrated generally as 40. The closed loop control system forms a mechanism whereby a feedback loop is employed to maintain the application circuit at a desired temperature. Because the illustrated closed loop control system comprises a heater means but no cooling mechanism, the closed loop control system of FIG. 3 is generally targeted to applications where it is desirable to maintain the application circuit at a temperature higher than the ambient temperature. Such a limitation, however, is not strictly necessary if the closed loop control system contains mechanisms to cool the application circuit below ambient temperature. As discussed in greater detail below, the mechanisms for reducing or eliminating parasitic feedback presented in this invention are generally applicable to any type of control circuit where parasitic feedback presents a problem. In the preferred embodiment, however, closed loop control system 40 is formed mostly, or entirely, on a single substrate using standard CMOS processes. Such an environment presents a particular need to address the problems of parasitic feedback. Hence, in such an environment the concepts of the present invention have particular applicability.

The temperature control means of the present invention comprises heater means for heating the substrate. In FIG. 3, such heater means is illustrated by heater 42. Heater 42 may be made using any type of device which can generate heat in response to an electrical signal. It is preferred, however, that heater 42 presently comprise transistors or other integrated circuit devices capable of generating a sufficient amount of heat to heat the substrate and application circuit 38. Heater 42 may be a single device or may be a plurality of devices distributed at various locations in order to achieve such benefits as minimizing thermal gradients and distributing the heat over a wider area.

Heater 42 and application circuit 38 are in thermal contact with each other as illustrated by dashed line 44. In the context of this invention, thermal contact simply means that heat flow is possible between any two devices or locations. For example, heater 42 need not be in physical contact with application circuit 38. Application circuit 38 may be built on a separate substrate and suspended in close proximity to heater 42. On the other hand, it may be desirable to form application circuit 38 either wholly or in part on the same substrate which contains closed loop control system 40. Such implementation details are subject to design considerations of the specific application circuit and intended environment and are not part of the present invention.

Embodiments within the scope of the present invention may comprise heater control means for controlling the heater means in response to the temperature sensed by a temperature sensing means. In FIG. 3 such heater control means comprises power amplifier 46 and error amplifier 48. Power amplifier 46 may be implemented using a wide variety of electronic devices as long as the selected device can deliver sufficient power to heater 42 in order to heat the substrate to the desired temperature. Power amplifier 46 is driven by error amplifier 48. Together, error amplifier 48 and power amplifier 46 represent a two stage amplification process which may be necessary to achieve the desired gain characteristics using the desired electronic devices. However, in certain implementations it may be desirable to only have a single amplification stage. The selection of a single stage or dual stage amplification process will be dependent upon the gain needed for proper operation of control system 40 and the technology used to implement the amplifiers. Such details are known to those with skill in the art and may be selected for any desired application. If the implementation illustrated in FIG. 2 were desired, it is preferred that a two stage amplifier be used as illustrated therein.

Embodiments within the scope of the present invention may comprise means for changing the characteristics of the heater control means. Such means may be used, for example, to create a large gain across amplifying circuits during initial warm up in order to reduce the time necessary to reach the desired operating parameters. The gain can then be reduced during steady state operation. Such means may also be used to switch on different heaters during warm up than during steady state operation. Thus by changing operating characteristics of the heater control means, a fast warm up time may be achieved through various means and then a low power steady state mode can be used for normal operation.

The present invention also comprises temperature sensing means for sensing the temperature of at least the substrate. In FIG. 3, the temperature of the substrate is sensed by temperature sensor 50. As discussed in greater detail below, temperature sensor 50 is in indirect thermal contact with heater 42 through the substrate in order that the temperature of the substrate may be determined and heater 42 controlled to achieve the desired temperature. Temperature sensor 50 may be a single temperature sensor located at a specific location on the substrate or may be several distributed sensors positioned at various locations on the substrate. It is sometimes desirable to use distributed temperature sensing in order to reduce the thermal gradients within the substrate and to gain a more accurate measurement of the temperature of the substrate at a critical location.

Temperature sensor 50 can be implemented via a wide variety of electronic structures. Many types of thyristors and electronic devices exhibiting characteristics which change according to temperature are known in the art and may be utilized for the purpose of sensing the temperature. These devices typically have a resistance or conductivity characteristic which varies according to temperature. Thus, sensors may be created which produce a voltage or current which varies according to the temperature of the device. In the preferred embodiment temperature sensor 50 is formed from the base emitter junction of a transistor device formed as described in greater detail below.

Because the voltage or current produced by temperature sensor 50 is often very small, it may be desirable to amplify such voltage or current. In FIG. 3 this amplification step is illustrated by sensor amplifier 52. The gain of sensor amplifier 52 is implementation specific and will depend upon the characteristics of the closed loop control system. Selecting such gain is known to those with skill in the art and need not be discussed further.

The temperature control means of the present invention may comprise means for setting the desired temperature. In FIG. 3, such means is illustrated by set temperature 54. As illustrated in FIG. 3, the difference between set temperature 54 and the signal from sensor amplifier 52 is utilized to drive heater 42 through error amplifier 48 and power amplifier 46.

Once power is applied to heater 42 there will be some delay before the substrate heats enough that temperature sensor 50 will detect a temperature difference. This delay is illustrated in FIG. 3 by thermal delay 56. The characteristics of thermal delay 56 are dependent upon the materials used for the substrate and the relative locations of heater 42 and sensor 50. Other factors which may influence thermal delay 56 are the packaging techniques used to package the closed loop control system and the implementation and packaging of application circuit 38. In many cases thermal delay 56 can be estimated but an accurate determination of thermal delay 56 generally requires fabrication of a prototype and laboratory measurements.

Temperature sensor 50 not only senses the temperature of the substrate but also senses the overall effect of the ambient temperature on the closed loop control system and application circuit. These effects are represented in FIG. 3 by summing block 58. The effects of the ambient temperature are usually mitigated somewhat by the thermal resistance of the packaging. This is represented in FIG. 3 by thermal resistance block 60. For many reasons it is often desirable to thermally isolate the closed loop control system and/or application circuit from the ambient temperature. If the application circuit is to be heated above ambient temperature, then there will be heat loss from the application circuit to the ambient environment. If this heat loss can be minimized then less power is required to maintain the application circuit at the desired temperature. Thus, great care is usually taken in packaging and thermally isolating the application circuit and closed loop control system from the ambient environment.

Since it is preferred that closed loop control system 40 be implemented on a substrate using conventional CMOS processes, parasitic feedback will also play a part in the operation of the circuit of FIG. 3. This parasitic feedback is illustrated in FIG. 3 by parasitic feedback block 62. As previously described, the parasitic feedback may have several origins such as signal coupling due to capacitance at various locations, parasitic coupling of the ohmic ground line connections, various ohmic drops in the substrate, and parasitic injection of charge carriers into the substrate or into regions of intended isolation. In all these cases, the effect of the parasitic feedback is to fool or trick temperature sensor 50 into believing that the substrate is either hotter or colder than the actual temperature. Such an effect can induce a high frequency oscillation in the closed loop control system.

As an example, consider a temperature sensor formed from a diode type device. If the parasitic feedback occurs because of parasitic injection of charge carriers into regions of intended isolation, the charge carriers may collect on the electrodes of the temperature sensor. This will result in a change in conductivity characteristics of the temperature sensor which is analogous to what happens when the temperature actually changes. Thus, the signal produced by the temperature sensor will indicate that the temperature is either warmer or colder than the actual temperature of the substrate. This will cause the error amplifiers to turn on or off. When the amplifiers turn on or off the injection of parasitic charge carriers into regions of intended isolation will likely change. This will cause temperature sensor 50 to register a temperature closer to the true temperature of the substrate. This will again cause the power amplifier to change state and the oscillation continues.

It is preferred that the closed loop control system of the present invention be implemented on a substrate using a conventional CMOS process. Thus, the first problem to be addressed in a CMOS implementation of a temperature controlled substrate system is the choice of a temperature sensing means which can be formed on the substrate using conventional CMOS process, preferably without any additional processing steps. The most common integrated temperature sensors are based upon the base emitter junction of a bipolar transistor. This is because the voltage of the base emitter junction, at a constant bias current, decreases with temperature by a very predictable amount, typically around 2.2 millivolts per degree Celsius. Although bipolar devices are not ordinarily available through a standard CMOS process, it is possible to fabricate a special purpose bipolar device. Such a device is illustrated in D. T. Comer, "Introduction to Mixed Signal VLSI Design" (Array Publishing Co., New York, 1994 (ISBN 0-9638049-0-1)).

Figure 4A:
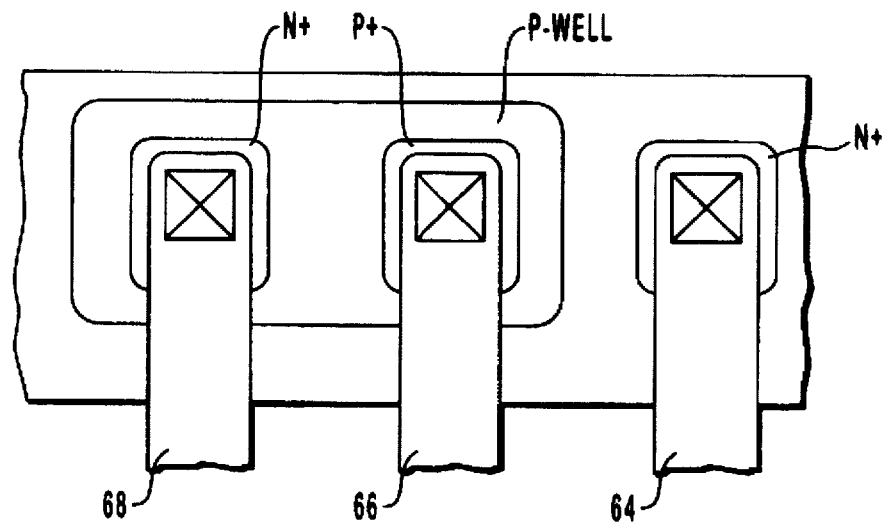
FIGS. 4A and 4B illustrate a bipolar device formed using conventional CMOS processes and which is used as a temperature sensor.
Figure 4B:
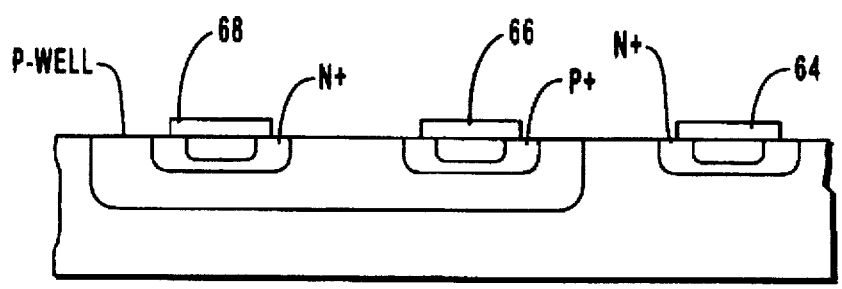

FIGS. 4A and 4B illustrate the top and cross-sectional views of such a special purpose bipolar device used in the presently preferred embodiment to implement temperature sensing means. In these figures, the bipolar device is fabricated using a standard P-well CMOS process. The collector 64 of the device shown in FIGS. 4A and 4B is comprised of the substrate or starting material of the wafer to be fabricated using the CMOS process. In this case, the substrate is a lightly doped N-material. The base 66 or the bipolar device is formed by the P-well diffusion of the CMOS process which is ordinarily used to create the required isolation for the N-channel MOS devices. The emitter 68 of the bipolar device is formed from the source/drain diffusions of the N-channel devices. This temperature sensor is only one example of temperature sensing means for sensing the temperature of the substrate. Other devices formed using different processes may also be used.

One problem with using such a device as a temperature sensor is that base 66 of the sensor, formed by a P-well diffusion, will act as a collector to any minority carriers present in the substrate in its immediate vicinity. This parasitic collection is unique to a bipolar device constructed without the benefit of individual isolation pockets as in the case for a bipolar device constructed on a CMOS process as illustrated in FIGS. 4A and 4B. The parasitic collection is highly undesirable and may affect the calibration of the temperature sensor in a nonlinear and unpredictable manner, or it may produce a sufficiently large parasitic gain that it may cause instability in the temperature control system which is usually manifest by a high frequency oscillation as previously described. The instability caused by this parasitic feedback is, in fact, the largest practical problem in designing a thermally controlled substrate on a CMOS process using this type of sensor.

In order to prevent parasitic feedback from inducing instability into a closed loop control system such as closed loop control system 40 of FIG. 3, the temperature control means of the present invention can comprise means for substantially reducing the effects of parasitic feedback in the closed loop control system. In one preferred embodiment, the means for substantially reducing the effects of parasitic feedback comprises means for minimizing parasitic collection of minority carriers around the base of the temperature sensor. One implementation of such means for minimizing parasitic collection of minority carriers is illustrated in FIGS. 5A and 5B.

Figure 5A:
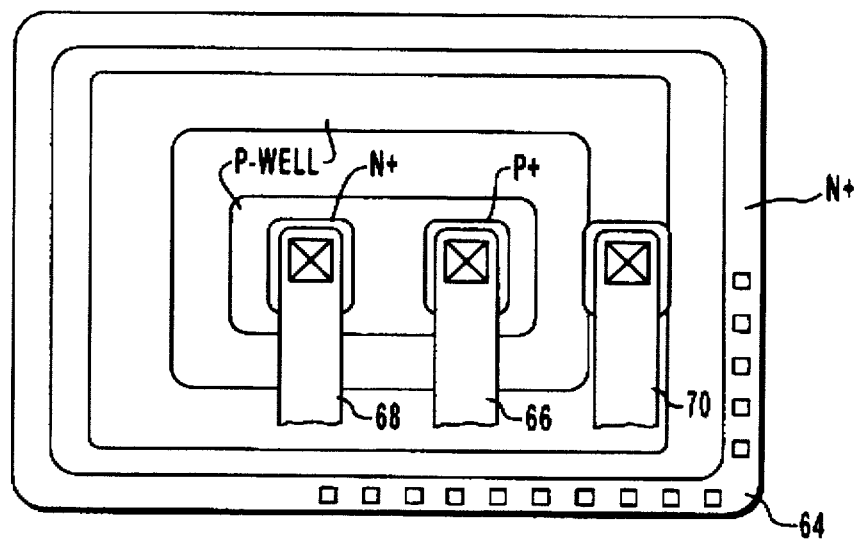
FIGS. 5A and 5B illustrate a bipolar device with guard rings to minimize collection of minority carriers around the base emitter junction in order to reduce parasitic feedback.
Figure 5B:
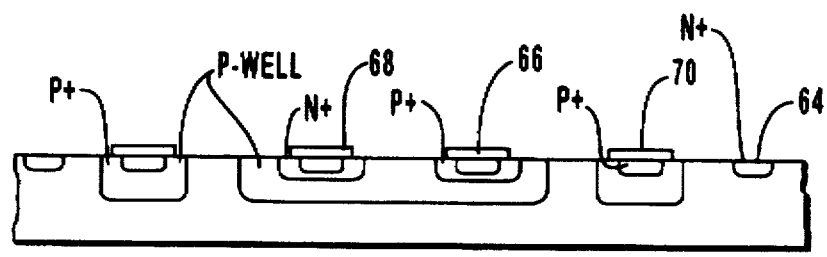

FIGS. 5A and 5B illustrate the temperature sensor of FIGS. 4A and 4B modified to include one type of means for minimizing parasitic collection of minority carriers around the base. As illustrated in FIGS. 5A and 5B, the means for minimizing parasitic collection of minority carriers around the base may comprise guard ring 70 disposed between collector 64 and base 66. Guard ring 70 comprises an additional P-well diffusion around the sensor device, which is electrically connected to the most negative potential on the substrate. This ring is intended to collect any minority carriers that are present in the substrate in the vicinity of the sensor transistor and to divert them to the negative bias potential before they are able to reach the base of the sensor transistor. Collector 64 has also been modified to create a ring which completely encloses the temperature sensor transistor. This is to make the region immediately around the sensor base tied to a positive potential and ensures a reverse bias voltage on all parts of the base.

Although a single guard ring is shown in FIGS. 5A and 5B, the means for minimizing parasitic collection of minority carriers around the base can comprise a plurality of guard rings. Such a plurality of guard rings can be created by alternating P-well rings with substrate contact rings and then repeating with additional alternating rings.

Although the guard rings will minimize the parasitic collection of minority carriers in the vicinity of the sensor transistor, they do not provide complete isolation. This is because the guard rings typically do not extend to a sufficient depth into the substrate to prevent "deep" minority carriers from passing beneath the guard ring. Thus, means and processes which can extend the depth of the guard rings can increase the efficiency of the guard rings and the isolation of the base.

It is generally desirable to increase the isolation as much as possible because a heated substrate system is especially susceptible to the generation of minority carriers in the substrate. This phenomena occurs primarily because of two reasons. First, because relatively high powers must be generated on the chip to produce the required heating, the heater and heater driver elements must conduct relatively high currents and operate at relatively high bias levels relative to the normal small signal operation generally encountered on a CMOS chip. This may give rise to injection of minority carriers into the substrate through any electrode which rises to a bias level approaching that of the substrate within any given region. The problem is made worse at higher temperatures, since the injection can occur with less forward bias. Thus, the addition of guard rings is effective in many cases in reducing the parasitic collection around the base of the temperature sensor below the level which causes instability and oscillation in the closed loop feedback system. It is not uncommon for thermally controlled substrate systems, implemented on an integrated substrate without means to mitigate the effects of parasitic feedback, to oscillate at a frequency in the megahertz range.

Figure 6:
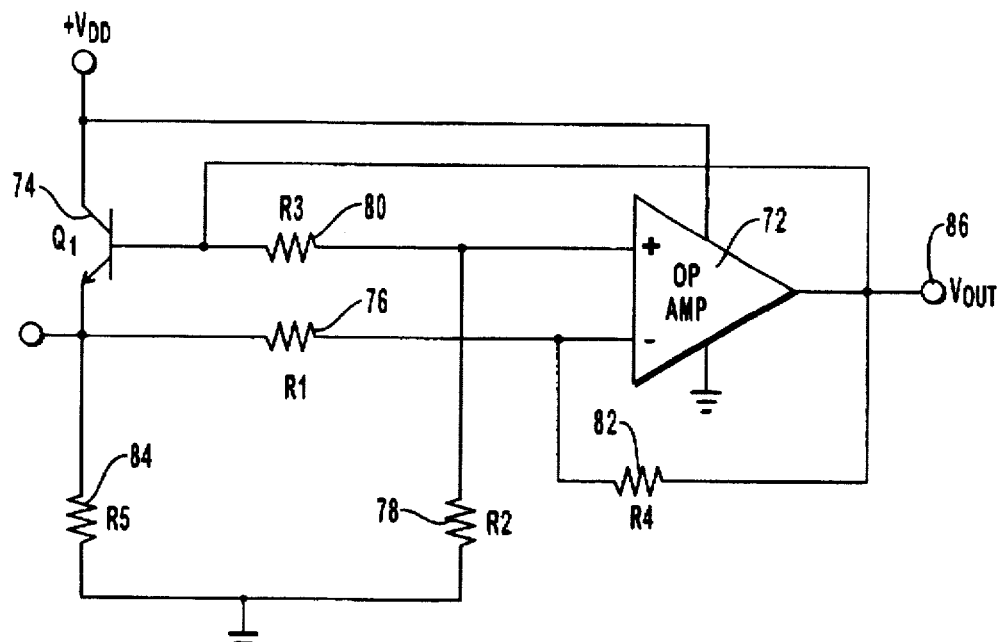
FIG. 6 is an amplification circuit used to amplify the base emitter voltage of the temperature sensor.

A bipolar device constructed as illustrated in FIGS. 4A-5B may be used as a temperature sensor in a closed loop feedback control system manufactured using a CMOS process provided that the system is specifically designed to accommodate its special characteristics. The temperature sensor will be referenced to the positive power supply and the sensor amplifier must be designed accordingly. One implementation of temperature sensing means and associated amplifying means, such as a combination of temperature sensor 50 and sensor amplifier 52 of FIG. 3, is illustrated in FIG. 6. The diagram illustrated in FIG. 6 is particularly well suited to a temperature sensor implemented as shown in FIGS. 4A-5B.

The circuit of FIG. 6 comprises op-amp 72, transistor 74, and resistors R1-R5, labeled 76-84, respectively. In FIG. 6 the base emitter junction of transistor 74 is used as the temperature sensor. The output voltage 86 is an amplified version of the base emitter voltage, $V_{be}$, of transistor 74. An analysis of the circuit of FIG. 6 reveals that the output voltage can be written as:

$$V_o = \frac{V_{be}\left(1 + \frac{R5}{R1+R4}\right)}{1 - \left(\frac{1}{R2+R3}\right)\left[R3 + R2 - \frac{R3}{R4}(R1+R4+R5)\right]}$$

Where: $V_O$ is the output voltage.
$V_{be}$ is the base-emitter voltage of transistor 74.
R1-R5 are the resistors shown in FIG. 6.

In one preferred embodiment R1 and R3 are 1.5 kΩ, R2 and R4 are 6 kΩ, and R5 is 10.5 kΩ. This results in a gain of 4 so that $V_O$, is four times $V_{be}$.

As previously discussed, the parasitic feedback path, represented by parasitic feedback block 62 of FIG. 3, may be due to a variety of mechanisms, most of which are unique to a VLSI implementation of the heated substrate system. In some cases, more than one of the parasitic feedback mechanisms may be present. As discussed above, the effect of the parasitic feedback, as illustrated in FIG. 3, is to cause instabilities or oscillations in the system which can reach into the megahertz range. The oscillations are due to the fact that the gain of the parasitic path may be higher than the gain of the normal thermal path represented by thermal delay 56.

One characteristic of temperature control means for forming a closed loop control system having a control loop for controlling the temperature of the substrate is that the thermal time constant of such a control loop is dramatically longer than the oscillations induced by parasitic feedback. In other words, although the parasitic feedback can cause oscillations in the megahertz range, many thermal control loops are designed for a bandwidth of a few hertz to several seconds. The parasitic feedback effects thus appear as high frequency noise introduced into a control loop whose bandwidth is dramatically lower.

Because the bandwidth of interest in a closed loop control system which controls the temperature of a heated substrate is dramatically lower than any oscillations introduced by parasitic feedback, the means for substantially reducing the effects of parasitic feedback can comprise means for reducing or eliminating high frequency noise introduced by parasitic feedback. A wide variety of mechanisms can be used to reduce or eliminate such high frequency noise. For example, filters can be introduced into the control loop which filter out high frequency noise components on various signals such as the voltage or current from a temperature sensor, or the voltage or current supplied to the heater means. The use of low pass filters on signal lines such as these can perform an integration or averaging function in order to smooth out rapid changes in these signals due to parasitic feedback. The overall result is to desensitize the control loop to high frequency noise and to limit the control loop to lower frequency signals.

The means for reducing the effects of parasitic feedback may also comprise one or more sample and hold means placed in the control path. Since the bandwidth of interest in a closed loop system for controlling the temperature of a substrate is very low, the control loop can be made to operate as a sampled or digital control system. Such a system takes a sample at a particular point in time and then makes an adjustment based on that sample. The time between samples is ignored. Since the time between samples is ignored, any high frequency noise components introduced by parasitic feedback are also ignored during those times.

Figure 7A:
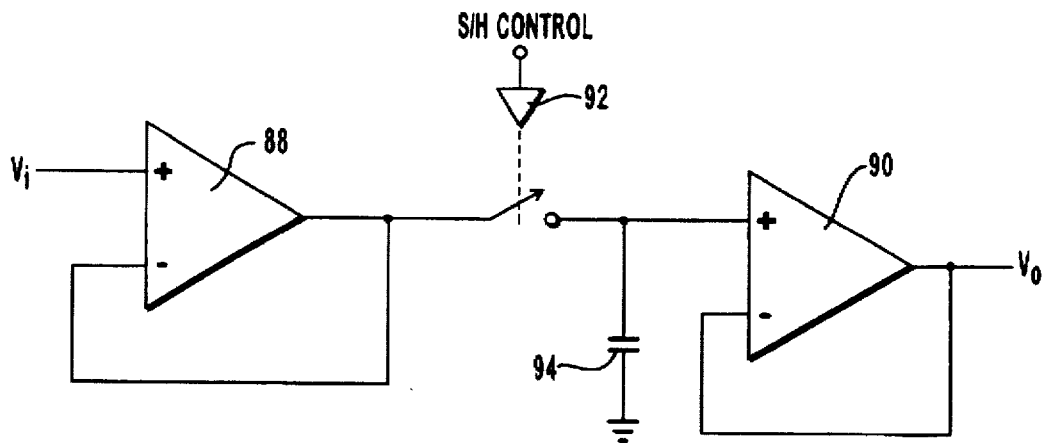
FIGS. 7A and 7B illustrate a sample and hold circuit and its associated characteristics.
Figure 7B:
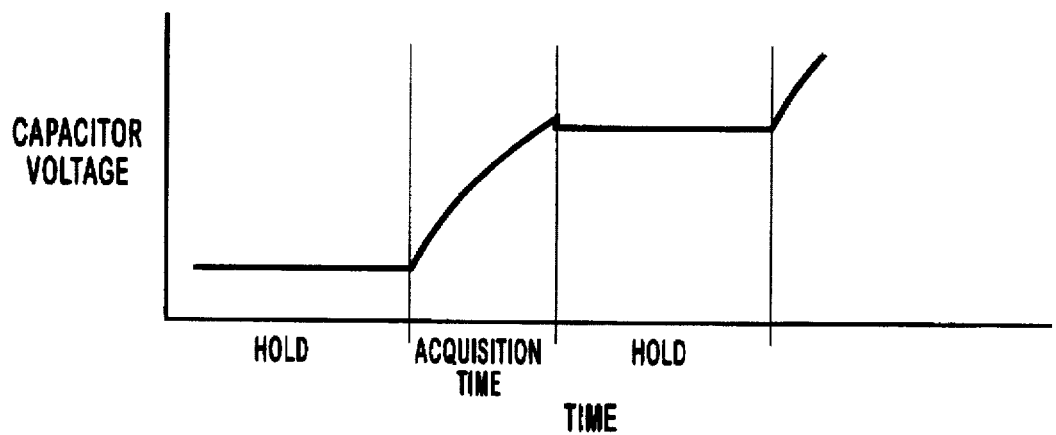

Turning now to FIGS. 7A and 7B, one implementation of a sample and hold means and the associated output voltage waveform is presented. Referring first to FIG. 7A, one example of a sample and hold means is illustrated in the diagram of a sample and hold circuit. The sample and hold circuit comprises two amplifiers such as op amps 88 and 90. As illustrated in FIG. 7A, op amps 88 and 90 are configured as emitter followers. Located between op amp 88 and op amp 90 is sample and hold control 92 and capacitor 94. It will readily be seen that when sample and hold control 92 closes the switch, capacitor 94 will charge and the output voltage of the sample and hold circuit will follow the voltage of capacitor 94. When sample and hold control 92 opens the switch, capacitor voltage 94 will continue to be supplied to op amp 90 and the output voltage will be maintained at an essentially constant level.

The sample and hold cycle is illustrated in greater detail in FIG. 7B. During the hold times, sample and hold control 92 opens the switch connecting amplifier 88 and amplifier 90 while during the acquisition time sample and hold control 92 closes the switch and capacitor 94 is charged to the voltage level at the input of amplifier 88. As illustrated in FIG. 7B, since it takes time for capacitor 94 to reach the voltage level input to amplifier 88, sample and hold control 92 must close the switch for a predetermined period of time. Typical acquisition times for such sample and hold circuits are from a few hundred nanoseconds to a few microseconds.

Although utilizing a sample and hold circuit eliminates the effects of parasitic feedback during the times when the sample and hold circuit is in the hold mode, during the acquisition time of the sample and hold circuit the control loop is closed and the effects of parasitic feedback are passed through the sample and hold circuit during the time that the sample and hold circuit is in the sample mode. The overall result of utilizing a sample and hold circuit in the control path of a feedback system is to allow the effects of parasitic feedback to be passed through the sample and hold circuit during a short period of time when the sample and hold circuit is in the sample mode to prevent the parasitic feedback effects from passing through the sample and hold circuit during a much longer period of time. This is because the acquisition time may be anywhere from a few hundred nanoseconds to a few microseconds while the time between samples may be hundreds of microseconds to several seconds.

In order to reduce the effects of parasitic feedback even further, the means for reducing the effects of parasitic feedback in the closed loop control system may comprise a plurality of sample and hold circuits connected in series. Such an implementation provides a way to present an essentially open circuit to the effects of parasitic feedback. In other words, such a mechanism basically precludes the effects of parasitic feedback from being passed through the sample and hold circuits.

Figure 8:
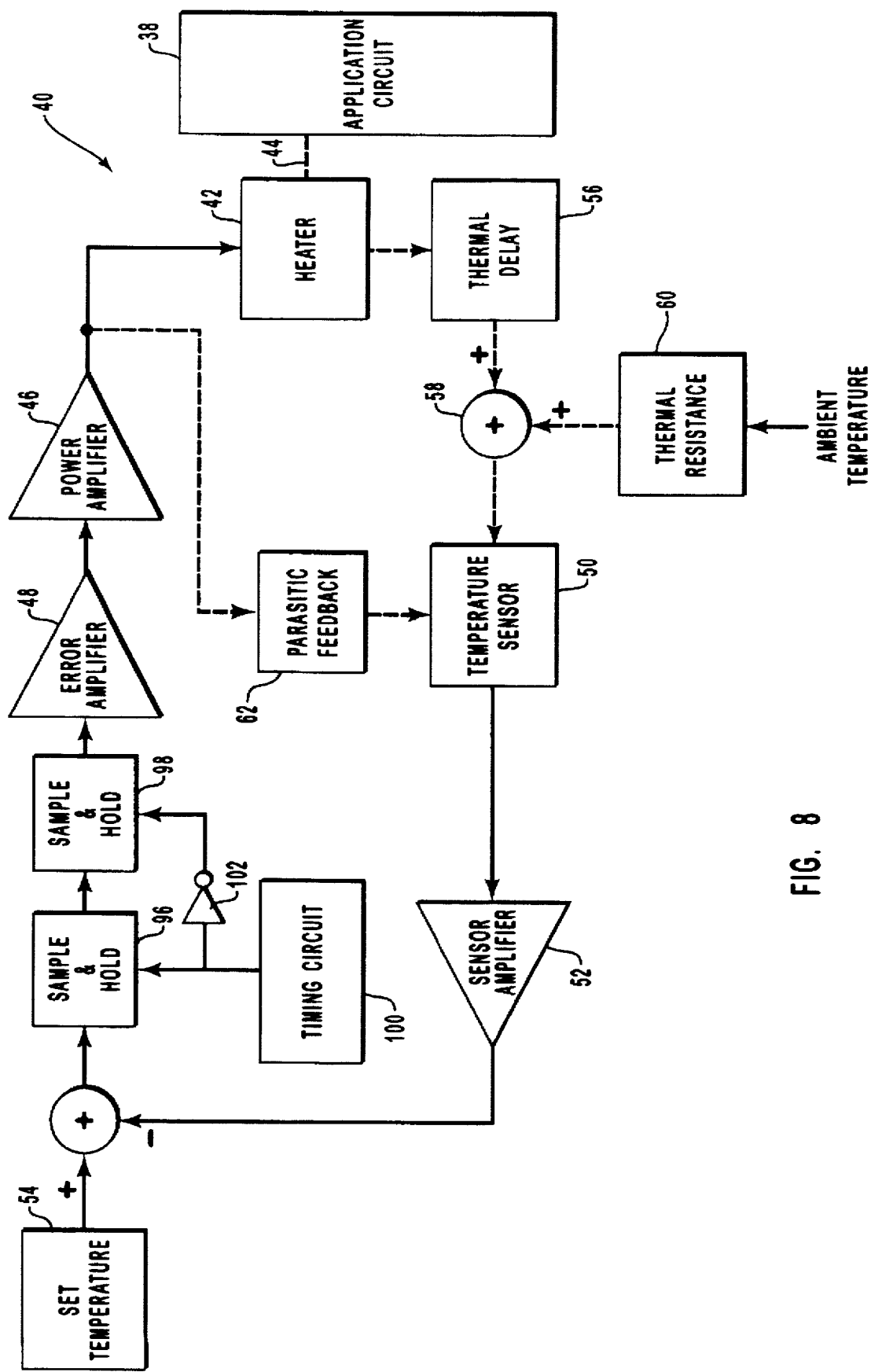
FIG. 8 is a closed loop control system according to the present invention which includes sample and hold circuits to minimize the effect of parasitic feedback.

Referring now to FIG. 8, one such implementation is presented. Elements in FIG. 8 which are common to those shown in FIG. 3 are numbered accordingly. Thus, the temperature of application circuit 38 is controlled by a temperature control means such as closed loop control system 40. As in FIG. 3, the temperature control means comprises heater means for heating the substrate, such as heater 42. Heater 42 and application circuit 38 are in thermal contact as illustrated by dashed line 44. The temperature control means also comprises heater control means for controlling the heater in response to the temperature sensed by a temperature sensor means. In FIG. 8, such heater control means comprises power amplifier 46 and error amplifier 48. The temperature control means also comprises temperature sensing means for sensing the temperature of the substrate. In FIG. 8, such temperature sensor means comprises temperature sensor 50. As with the embodiment illustrated in FIG. 3, it may be desirable to amplify the signal from temperature sensor 50. This is illustrated in FIG. 8 by sensor amplifier 52. The temperature control means can also comprise means for setting the temperature such as set temperature 54. As in FIG. 3, the thermal delay between heater 42 and temperature sensor 50 is represented by thermal delay block 56, the effect of the ambient temperature is represented by summing block 58 and thermal resistance 60, and the effects of parasitic feedback are represented by parasitic feedback block 62.

Temperature control means within the scope of the present invention also comprise means for substantially reducing the effects of parasitic feedback. In FIG. 8, such means may comprise, for example, temperature sensing means comprising means for minimizing a collection of parasitic carriers around the base of such temperature sensing means. In the embodiment illustrated in FIG. 8, the means for substantially reducing the effects of parasitic feedback may also comprise one or more sample and hold circuits such as sample and hold circuits 96 and 98. As illustrated in FIG. 8, sample and hold circuits 96 and 98 are connected in series so that the sample taken by sample and hold circuit 96 is passed forward to sample and hold circuit 98. As illustrated in FIG. 8, sample and hold circuits 96 and 98 are controlled by timing circuit 100. As illustrated by inverter 102, sample and hold circuits 96 and 98 are operated so that when one sample and hold circuit is in the sample mode, the other sample and hold circuit is in the hold mode. Thus, a sample taken by sample and hold circuit 96 will be passed forward to sample and hold circuit 98 and then passed on to error amplifier 48 while presenting an essentially open circuit to any parasitic feedback effects.

In order to explain how sample and hold circuits 96 and 98 pass samples forward into the control loop while presenting an essentially open circuit to parasitic feedback, reference is next made to FIGS. 9A–9D. In FIGS. 9A–9D, the dashed lines represent common timing reference lines so that the time reference between FIGS. 9A–9D can be ascertained.

Figure 9A:
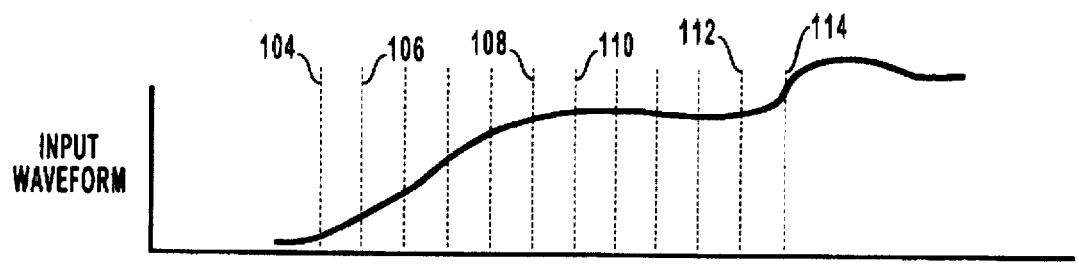
FIGS. 9A–9D illustrate the input waveform, the output of the first sample and hold circuit, the output of the second sample and hold circuit, and the timing waveform of dual sample and hold circuits used to reduce parasitic feedback according to the present invention.

Referring first to FIG. 9A, an input waveform is shown. This figure represents an input waveform to sample and hold circuit 96 of FIG. 8. For simplicity, a relatively smooth line is shown and no attempt has been made to identify the high frequency parasitic feedback effects which can cause oscillations in this waveform in the megahertz range.

Figure 9B:
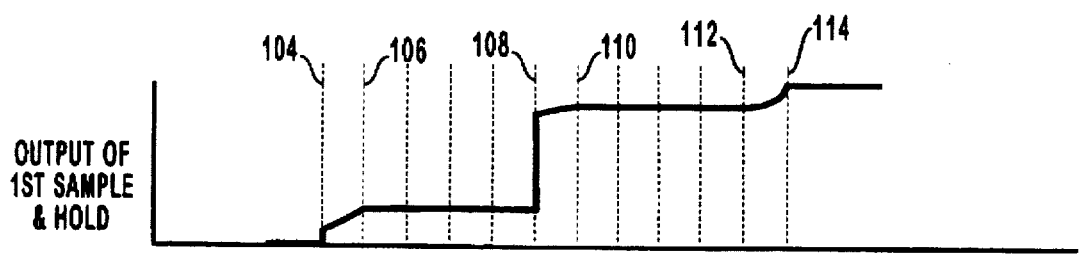
Figure 9C:
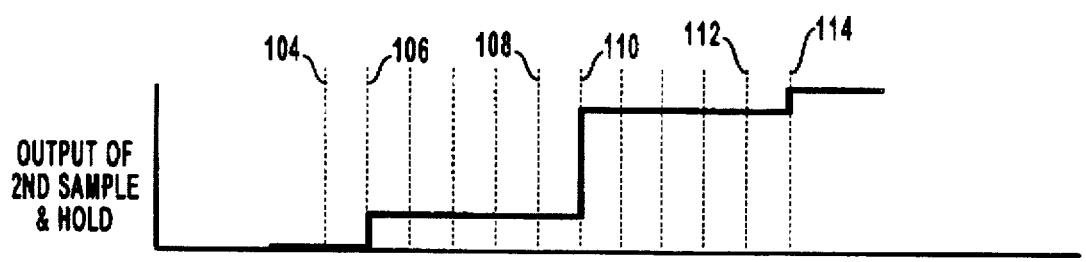
Figure 9D:
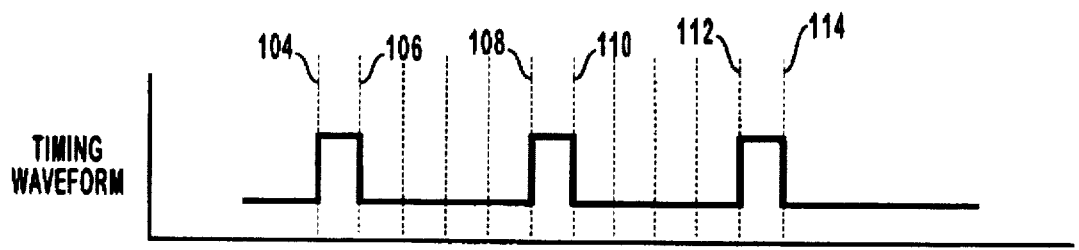

Referring next to FIG. 9D, the output of timing circuit 100 is presented. In FIG. 9D, a relatively low duty cycle is illustrated. Theoretically, however, the duty cycle can be virtually any combination, although practical considerations may put constraints on the range of duty cycles which should be used. It is presumed that the acquisition time of sample and hold circuits 96 and 98 are a small fraction of the time between the dashed time reference lines of FIGS. 9A–9D. This assumption, however, is not restrictive and an analysis will show similar results for all practical duty cycles which allow sufficient acquisition time for sample and hold circuits 96 and 98. In FIG. 9D, it is presumed that sample and hold circuit 96 enters the sample mode when the timing waveform shown in FIG. 9D rises and enters the hold mode when the timing waveform illustrated in FIG. 9D falls. This implies that sample and hold circuit 98 enters the sample mode when the timing waveform in FIG. 9D falls and enters the hold mode when the timing waveform shown in FIG. 9D rises.

Next, referring to FIG. 9B, the output of sample and hold circuit 96 is presented. When sample and hold circuit 96 enters the sample mode at time reference 104, sample and hold circuit 96 quickly acquires the input voltage and then follows the input waveform until time reference 106. At this time, sample and hold circuit 96 enters the hold mode and the output voltage remains constant, as illustrated in FIG. 9B.

Referring now to FIG. 9C, the output of sample and hold circuit 98 is presented. As sample and hold circuit 96 enters the hold mode at timing reference 106, sample and hold circuit 98 enters the sample mode and the output of sample and hold circuit 98 quickly reaches the input level which is the output of sample and hold circuit 96. As indicated in FIG. 9C, at time reference 106, the output of sample and hold circuit 98 is the voltage level of the input waveform shown in FIG. 9A at time reference 106. In other words, the output of sample and hold circuit 98 closely approximates an ideal sample and hold circuit which has an output equal to the input at one specific moment in time and then maintains that level until another sample is taken. This is illustrated in FIG. 9C by the constant level which is maintained by sample and hold circuit 98 until another sample is taken.

As indicated in FIGS. 9A–9D, the process repeats itself with sample and hold circuit 96 acquiring and following the input waveform when it enters the sample mode at time reference 108 and 112 and then passing the sample forward to sample and hold circuit 98 when sample and hold circuit 98 enters the sample mode and sample and hold circuit 96 enters the hold mode at time reference 110 and 114.

By coupling two sample and hold circuits 96 and 98 in series and operating them as shown in FIG. 8 and FIGS. 9A–9D, it can be seen that sample and hold circuits 96 and 98 together approximate a theoretical sample and hold circuit to a very close degree. Such performance presents an essentially open circuit to the effects of parasitic feedback while allowing information measured by temperature sensor 50 to be passed forward in order to control heater 42. Any method of approximating a theoretical sample and hold circuit will give good performance. The more closely the sample and hold means used in the circuit approximates a theoretical sample and hold circuit, the more the effects of parasitic feedback will be reduced. It may also be desirable to place integrators or low pass filters in front of the sample and hold means in order to filter the high frequency effects of parasitic feedback to a greater degree. As previously mentioned, this will have the effect of filtering or averaging out the high frequency noise introduced by parasitic feedback. Any type of sample and hold means which can present an essentially open circuit to the effects of parasitic feedback can be utilized as an implementation of the means for substantially reducing the effects of parasitic feedback. All such equivalents should be embraced within the scope of this invention.

While the embodiments illustrated in this invention have discussed several implementations of the means for substantially reducing the effects of parasitic feedback in the closed loop control system in a manner which may indicate that they are to be employed individually, the means for substantially reducing the effects of parasitic feedback can be employed either individually or in combination with each other. Different implementations may require different solutions. For example, if implementing the temperature sensing means with guard rings as illustrated in FIGS. 5A and 5B is sufficient to reduce or eliminate the effects of parasitic feedback to an acceptable level, then the additional expense of implementing sample and hold circuits along with the associated timing control means need not be incurred. On the other hand, there may be implementations where parasitic feedback should be eliminated to the greatest degree possible. In such a situation, it may be desirable to implement a combination of methods to substantially eliminate the effects of parasitic feedback.

In summary, the present invention involves ways to reduce or eliminate parasitic feedback in a closed loop control system. The particular application of interest are control loops which control the temperature of a substrate and where the control loop is implemented either largely or wholly on a single substrate. However, some of the techniques disclosed in this invention to mitigate the effects of parasitic feedback extend well beyond the narrow implementation and intended application disclosed in this patent application. Therefore, the embodiments illustrated in this application should be construed as exemplary and not as limiting the scope of the invention. As disclosed herein, the temperature control means for forming a closed loop control system having a control loop which controls the temperature of a substrate comprises means for substantially reducing the effects of parasitic feedback. Such means may comprise on the one hand means for minimizing parasitic collection of minority carriers around the base of a temperature sensing means employed in the temperature control means. The means for substantially reducing parasitic feedback may also comprise sample and hold means which present a substantially open circuit to parasitic feedback. Finally, the means for substantially reducing the effects of parasitic feedback may also comprise other means for eliminating the high frequency noise components induced by parasitic feedback. Such means may comprise filters, integrators, or other means to average or eliminate the high frequency noise.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A substrate heated application circuit including an improved closed loop control circuit, formed on a substrate and in thermal contact with the application circuit, for controlling temperature of at least the substrate, said closed loop control circuit comprising:

heater means for heating the substrate;

temperature sensing means for sensing the temperature of at least the substrate, said temperature sensing means comprising at least one bipolar transistor device having a base region formed on the substrate;

heater control means, electrically connected to both the heater means and the temperature sensing means, for controlling the heater means in response to the temperature sensed by the temperature sensing means; and means, formed in the control loop, for substantially reducing the effects of parasitic feedback in said closed loop control system, said means for substantially reducing the effects of parasitic feedback comprising in combination (a) means for minimizing parasitic collection of minority carriers around the base region of said bipolar transistor device, and (b) a plurality of sample and hold circuit means connected in series in said closed circuit control loop, and configured so that at least one sample and hold circuit means is open when at least one other sample and hold circuit means is closed.

2. A substrate heated application circuit as recited in claim 1 wherein the application circuit is an oscillator circuit.

3. A substrate heated application circuit as recited in claim 1 wherein the application circuit is at least partially formed on the substrate.

4. A substrate heated application circuit as recited in claim 1 wherein the application circuit resides in close proximity to the substrate.

5. A substrate heated application circuit comprising:
  a) temperature control means, formed on a substrate, for forming a closed loop control system having a control loop for controlling the temperature of at least the substrate, the temperature control means comprising:
    i) heater means for heating the substrate;
    ii) temperature sensing means for sensing the temperature of at least the substrate;
    iii) heater control means, electrically connected to both the heater means and the temperature sensing means, for controlling the heater means in response to the temperature sensed by the temperature sensing means; and
    iv) means, in the control loop, for substantially reducing the effects of parasitic feedback in said closed loop control system, said means for substantially reducing the effects of parasitic feedback comprising a plurality of sample and hold circuit means connected in series in said closed circuit control loop, and configured so that at least one sample and hold circuit means is open when at least one other sample and hold circuit means is closed; and
  b) an application circuit in thermal contact with the substrate.

6. A substrate heated application circuit as recited in claim 5 further comprising timing means for switching each sample and hold circuit means from a sample state to a hold state.

7. A substrate heated application circuit as recited in claim 6 wherein the timing means switches each sample and hold circuit means in a manner that allows the heater control means to receive data samples at a rate substantially equal to the thermal time constant of the substrate heated application circuit.

8. A substrate heated application circuit as recited in claim 7 wherein the temperature sensing means comprises a bipolar transistor device, having a base, an emitter, and a collector, manufactured on the substrate using a CMOS process.

9. A substrate heated application circuit as recited in claim 8 wherein the means for substantially reducing the effect of parasitic feedback further comprises means for minimizing the parasitic collection of minority carriers in the vicinity of the base.

10. A substrate heated application circuit as recited in claim 9 wherein the application circuit is an oscillator circuit.

11. A substrate heated application circuit as recited in claim 10 wherein the application circuit is at least partly formed on the substrate.

12. A substrate heated application circuit as recited in claim 10 wherein the application circuit resides in close proximity to the substrate.

13. A substrate heated application circuit comprising:
  a) temperature control means, formed on a substrate, for forming a closed loop control system for controlling the temperature of the substrate, the temperature control means comprising:
    i) heater means for heating the substrate;
    ii) temperature sensing means for sensing the temperature of at least the substrate, said temperature sensing means comprising at least one bipolar transistor device having a base region formed on the substrate;
    iii) heater control means, electrically connected to both the heater means and the temperature sensing means, for controlling the heater means in response to the temperature sensed by the temperature sensing means; and
    iv) means, formed as part of the closed loop control system, for substantially reducing the effects of parasitic feedback in said closed loop control system, said means for substantially reducing the effects of parasitic feedback comprising in combination (a) means for minimizing parasitic collection of minority carriers around the base region of said bipolar transistor device, and (b) a plurality of sample and hold circuit means connected in series in said closed circuit control loop, and configured so that at least one sample and hold circuit means is open when at least one other sample and hold circuit means is closed; and
  b) an application circuit in thermal contact with the substrate.

14. A substrate heated application circuit as recited in claim 13 wherein the means for minimizing parasitic collection of minority carriers around the base comprises at least one guard ring disposed between the base and the collector.

15. A substrate heated application circuit as recited in claim 14 wherein the application circuit is an oscillator circuit.

16. An integrated closed loop control system for controlling the temperature of at least a heated substrate comprising:
  a) substrate means for receiving integrated circuits formed using an integrated circuit processing technique;
  b) heater means, formed on the substrate means, for heating the substrate;
  c) temperature sensing means, formed on the substrate means, for sensing the temperature of at least the substrate;
  d) heater control means, electrically connected to both the heater means and the temperature sensing means, for controlling the heater means in response to the temperature sensed by the temperature sensing means; and
  e) means, formed on the substrate means, for substantially reducing the effects of parasitic feedback, said means for substantially reducing the effects of parasitic feedback comprising a plurality of sample and hold circuit means connected in series and configured so that at least one sample and hold circuit means is open when at least one other sample and hold circuit means is closed.

17. An integrated closed loop control system as recited in claim 16 wherein the temperature sensing means comprises a bipolar transistor device fabricated using a CMOS process.

18. An integrated closed loop control system as recited in claim 17 wherein the bipolar transistor device has a base means for forming the base of a bipolar transistor device and wherein the means for substantially reducing the effects of parasitic feedback comprises means for minimizing parasitic collection of minority carriers around the base means.

19. An integrated closed loop control system for controlling the temperature of at least a heated substrate comprising:

ii substrate means for receiving integrated circuits formed using an integrated circuit processing technique;

ii heater means, formed on the substrate means, for heating the substrate;

ii temperature sensing means, formed on the substrate means, for sensing the temperature of at least the substrate, said temperature sensing means comprising at least one bipolar transistor device having a base region formed on the substrate;

ii heater control means, electrically connected to both the heater means and the temperature sensing means, for controlling the heater means in response to the temperature sensed by the temperature sensing means; and ii means, formed on the substrate means, for substantially reducing the effects of parasitic feedback, said means for substantially reducing the effects of parasitic feedback comprising in combination (a) means for minimizing parasitic collection of minority carrier around the base region of said bipolar transistor device, and (b) a plurality of sample and hold circuit means connected in series and configured so that at least one sample and hold circuit means is open when at least one other sample and hold circuit means is closed.

20. An integrated closed loop control system as recited in claim 19 further comprising timing means for switching each sample and hold circuit means from a sample state to a hold state.

21. An integrated closed loop control system as recited in claim 20 wherein the timing means switches each sample and hold circuit means in a manner that allows the heater control means to receive data samples at a rate substantially less than the frequency of parasitic feedback noise.

22. An integrated closed loop control system as recited in claim 19 wherein the integrated circuits formed on the substrate are formed using a CMOS process.

\* \* \* \* \*

UNITED STATES PATENT AND TRADEMARK OFFICE
CERTIFICATE OF CORRECTION

PATENT NO. : 5,798,502
DATED : Aug. 25, 1998
INVENTOR(S) : Donald T. Comer

It is certified that error appears in the above-identified patent and that said Letters Patent is hereby corrected as shown below:

Col. 5, line 41, after "circuit" change "is" to --are--

Col. 16, line 19, after "particular" change "application" to --applications--

Col. 19, line 10, before "substrate" change "ii" to --a)--

Col. 19, line 12, before "heater" change "ii" to --b)--

Col. 19, line 14, before "temperature" change "ii" to --c)--

Col. 19, line 19, before "heater" change "ii" to --d)--

Col. 20, line 1, before "means," change "ii" to --e)--

Col. 20, line 5, after "minority" change "carrier" to --carriers--

Signed and Sealed this

Twenty-second Day of June, 1999

Attest:

Q. TODD DICKINSON

*Attesting Officer*   *Acting Commissioner of Patents and Trademarks*